(12) United States Patent
Yuan et al.

(10) Patent No.: US 10,981,251 B2
(45) Date of Patent: Apr. 20, 2021

(54) METHOD AND DEVICE FOR CUTTING SAPPHIRE

(71) Applicant: HAN'S LASER TECHNOLOGY INDUSTRY GROUP CO., LTD., Shenzhen (CN)

(72) Inventors: Xuerui Yuan, Shenzhen (CN); Xiaojun Zhang, Shenzhen (CN); Lingtian Diao, Shenzhen (CN); Yuguo Peng, Shenzhen (CN); Jiangang Lu, Shenzhen (CN); Xiao Liu, Shenzhen (CN); Guodong Ma, Shenzhen (CN); Jiangang Tang, Shenzhen (CN); Jiangang Yin, Shenzhen (CN); Yunfeng Gao, Shenzhen (CN)

(73) Assignee: HAN'S LASER TECHNOLOGY INDUSTRY GROUP CO., LTD, Shenzhen (CN)

( * ) Notice: Subject to any disclaimer, the term of this patent is extended or adjusted under 35 U.S.C. 154(b) by 266 days.

(21) Appl. No.: 16/094,374

(22) PCT Filed: Jun. 8, 2016

(86) PCT No.: PCT/CN2016/085306
§ 371 (c)(1),
(2) Date: Oct. 17, 2018

(87) PCT Pub. No.: WO2017/210899
PCT Pub. Date: Dec. 14, 2017

(65) Prior Publication Data
US 2019/0118306 A1 Apr. 25, 2019

(51) Int. Cl.
*B23K 26/53* (2014.01)
*B23K 26/06* (2014.01)
(Continued)

(52) U.S. Cl.
CPC .......... *B23K 26/53* (2015.10); *B23K 26/0006* (2013.01); *B23K 26/06* (2013.01);
(Continued)

(58) Field of Classification Search
CPC .................. B23K 26/0264; B23K 26/0604; B23K 26/16; B23K 26/0821; B23K 26/0006; B23K 26/361
(Continued)

(56) References Cited

U.S. PATENT DOCUMENTS 6,340,806 B1 * 1/2002 Smart ................ B23K 26/0736
219/121.62
2002/0088780 A1 * 7/2002 Boyle .................... B23K 26/40
219/121.69

(Continued)

FOREIGN PATENT DOCUMENTS

CN 1758986 A 4/2006
CN 101505908 A 8/2009
(Continued)

OTHER PUBLICATIONS

International Search Report Application No. PCT/CN2016/085306 dated Feb. 24, 2017.
(Continued)

*Primary Examiner* — Thien S Tran
(74) *Attorney, Agent, or Firm* — von Briesen & Roper, s.c.

(57) ABSTRACT

A method for cutting sapphire comprising a sapphire body and a coating formed on the sapphire body, the method comprising: focusing a first $CO_2$ laser beam the coating via a $CO_2$ focusing assembly to remove the coating with a predetermined thickness extending along a first path; wherein dust and debris generated during removal of the coating are removed while the coating is removed; focusing
(Continued)

an ultrafast laser beam on the sapphire body via an optical path shaping assembly to form a plurality of restructuring channels distributed along a second path and penetrating through the sapphire; wherein the second path coincides with the first path; scanning, by the second $CO_2$ laser beam, the sapphire body via a galvanometer focusing assembly, wherein a path of the second $CO_2$ laser beam scanning the sapphire body via a galvanometer focusing assembly coincides with or deviates from the second path, so that the sapphire cracks along the restructuring channels.

16 Claims, 11 Drawing Sheets

(51) Int. Cl.
*B23K 26/0622* (2014.01)
*B23K 26/082* (2014.01)
*B23K 26/00* (2014.01)
*B23K 26/16* (2006.01)
*B28D 5/00* (2006.01)

(52) U.S. Cl.
CPC ...... *B23K 26/0604* (2013.01); *B23K 26/0624* (2015.10); *B23K 26/0821* (2015.10); *B23K 26/16* (2013.01); *B28D 5/0011* (2013.01)

(58) Field of Classification Search
USPC ........ 219/121.62, 121.69; 438/455, 458, 478
See application file for complete search history.

(56) References Cited

U.S. PATENT DOCUMENTS

| | | | | |
|---|---|---|---|---|
| 2006/0223330 | A1* | 10/2006 | Fudeta | H01L 21/2007 438/752 |
| 2011/0132885 | A1 | 6/2011 | Sercel et al. | |
| 2013/0183837 | A1 | 7/2013 | Arai et al. | |
| 2015/0038313 | A1* | 2/2015 | Hosseini | B23K 26/0648 501/32 |
| 2015/0165548 | A1 | 6/2015 | Marjanovic et al. | |
| 2015/0283650 | A1* | 10/2015 | Aikawa | B23K 26/1476 219/121.8 |
| 2016/0096238 | A1* | 4/2016 | Spiess | B23K 26/1462 219/121.71 |

FOREIGN PATENT DOCUMENTS

| | | |
|---|---|---|
| CN | 102233479 A | 11/2011 |
| CN | 102773612 A | 11/2012 |
| CN | 102773612 B | 6/2015 |
| CN | 105209218 | 12/2015 |
| EP | 1609558 A1 | 12/2005 |
| EP | 2754524 A1 | 7/2014 |
| JP | H 4364088 A | 12/1992 |
| JP | 2005528307 A | 9/2005 |
| JP | 2007151319 A | 6/2007 |
| JP | 2011243874 A * | 12/2011 |
| JP | 2011243874 A | 12/2011 |
| JP | 5213112 B2 | 6/2013 |
| JP | 2013536081 A | 9/2013 |
| JP | 2014028755 A | 2/2014 |
| JP | 2014510398 A | 4/2014 |
| JP | 2014079794 A | 5/2014 |
| JP | 2015032794 A | 2/2015 |
| JP | 2016513024 A | 5/2016 |
| JP | 2017507034 A | 3/2017 |
| KR | 10-1161731 B1 | 7/2012 |
| KR | 20120098869 A | 9/2012 |
| KR | 10-20130076440 A | 7/2013 |
| WO | WO 2008/024432 A2 | 2/2008 |
| WO | WO 2013/138802 A1 | 9/2013 |
| WO | WO 2015/116635 A1 | 8/2015 |

OTHER PUBLICATIONS

Korean Office Action related to Chinese Application No. 2018-7035592 dated Feb. 10, 2020.
European Search Report related to Application No. EP 16904352.8 dated Nov. 25, 2019.
Chinese Office Action related to Chinese Application No. 2018-551972 dated Nov. 12, 2019.
Korean Office Action related to Korean Application No. 2018-7035592 dated Jun. 23, 2020.

* cited by examiner

METHOD AND DEVICE FOR CUTTING SAPPHIRE

CROSS-REFERENCE TO RELATED APPLICATION

This patent application is a 35 USC § 371 U.S. national stage of International Application No. PCT/CN2016/085306 filed on Jun. 8, 2016.

TECHNICAL FIELD

The present disclosure relates to a method and device for cutting sapphire.

BACKGROUND

Sapphire is used as a diaphragm of precision instruments, a precision part and a LED (Light Emitting Diode) substrate because of its high hardness, scratch resistance, high temperature resistance, good chemical stability, etc. With a rapid development of the consumer electronics market in recent years, applications of sapphire in the field of consumer electronics have shown a sharp increase. Glass materials applied to cell phone screens, cameras, back buttons and fingerprint recognition modules are replaced gradually by sapphire.

In a conventional sapphire processing process, firstly, sapphire dies are processed, and then other coating processes are performed. Therefore, the processing technic of the sapphire is cumbersome and inefficient. As market demands continue to increase, in sapphire processing, a direct processing of a sapphire composite material with a coating has gradually emerged. However, in general, the direct processing of the sapphire composite material with the coating has a problem that the damage area of the coating is large.

SUMMARY

Accordingly, it is necessary to provide a method and device for cutting sapphire with a relative small damage area of a coating.

A method for cutting sapphire comprising a sapphire body and a coating formed on the sapphire body, the method comprising:

focusing a first $CO_2$ laser beam the coating via a $CO_2$ focusing assembly to remove the coating with a predetermined thickness extending along a first path; wherein dust and debris generated during removal of the coating are removed while the coating is removed;

focusing an ultrafast laser beam on the sapphire body via an optical path shaping assembly to form a plurality of restructuring channels distributed along a second path and penetrating through the sapphire; wherein the second path coincides with the first path; and scanning, by the second $CO_2$ laser beam, the sapphire body via a galvanometer focusing assembly, wherein a path of the second $CO_2$ laser beam scanning the sapphire body via a galvanometer focusing assembly coincides with or deviates from the second path, so that the sapphire cracks along the restructuring channels.

A device for cutting sapphire, comprising:

a first $CO_2$ laser configured to generate a first $CO_2$ laser beam;

a $CO_2$ focusing assembly disposed on the first $CO_2$ laser and configured to focus the first $CO_2$ laser beam on the coating to remove the coating with a predetermined thickness extending along a first path;

a blowing assembly disposed on the $CO_2$ focusing assembly and configured to blow off dust and debris generated during removal of the coating;

a dust extraction assembly configured to extract the dust and the debris;

a ultrafast laser configured to generate a ultrafast laser beam;

an optical path shaping assembly disposed on the ultrafast laser and configured to focus the ultrafast laser beam on the sapphire body to form a plurality of restructuring channels distributed along the second path and penetrating through the sapphire;

a second $CO_2$ laser configured to generate a second $CO_2$ laser beam; and a galvanometer focusing assembly disposed on the second $CO_2$ laser and configured to enable the second $CO_2$ laser beam to scan the sapphire body, so that the sapphire cracks along the restructuring channels.

BRIEF DESCRIPTION OF DRAWINGS

In order to illustrate the technical solutions according to the embodiments of the present disclosure or in the prior art more clearly, the drawings for describing the embodiments or the prior art are introduced briefly in the following. Apparently, the drawings in the following description are only some embodiments of the present disclosure, and for those of ordinary skill in the art, the drawings of other embodiments may be obtained from the drawings without the creative efforts.

DETAILED DESCRIPTION

Figure 1:
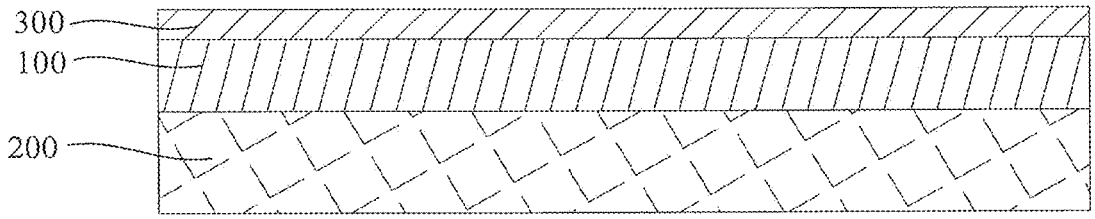
FIG. 1 is a sectional view of a sapphire according to an embodiment.

For the convenience of understanding the present disclosure, the method and the device for cutting sapphire will be described more fully hereinafter with reference to the drawings. A preferred embodiment of a method and device for cutting sapphire is given in the drawings. However, the method and device for cutting sapphire can be implemented in many different forms and be not limited to the embodiments described herein. Rather, the purpose of providing these embodiments is to make the disclosure of the method and device for cutting sapphire more thorough and comprehensive.

All technical and scientific terms used herein have the same meaning as commonly understood by one of ordinary skill in the art, unless otherwise defined. The terms used herein in the specification of the method and device for cutting sapphire are for the purpose of describing the specific embodiments and are not intended to limit the present disclosure. The term "and/or" used herein comprises any and all combinations of one or more of the associated listed items.

As shown in FIG. 1, a method is provided for cutting sapphire 10 according to an embodiment. The sapphire 10 comprises a coating 100 and a sapphire body 200, and the coating 100 is formed on the sapphire body 200. In the present embodiment, the sapphire 10 is in the form of a sheet. The sapphire 10 comprises the coating 100 and the sapphire body 200. Specifically, the sapphire body 200 is a substrate, and the sapphire body 200 is plated with one or more layers of the coating 100, that is, the coating 100 and the sapphire body 200 are located on two opposite sides of the sapphire 10, respectively.

Figure 2:
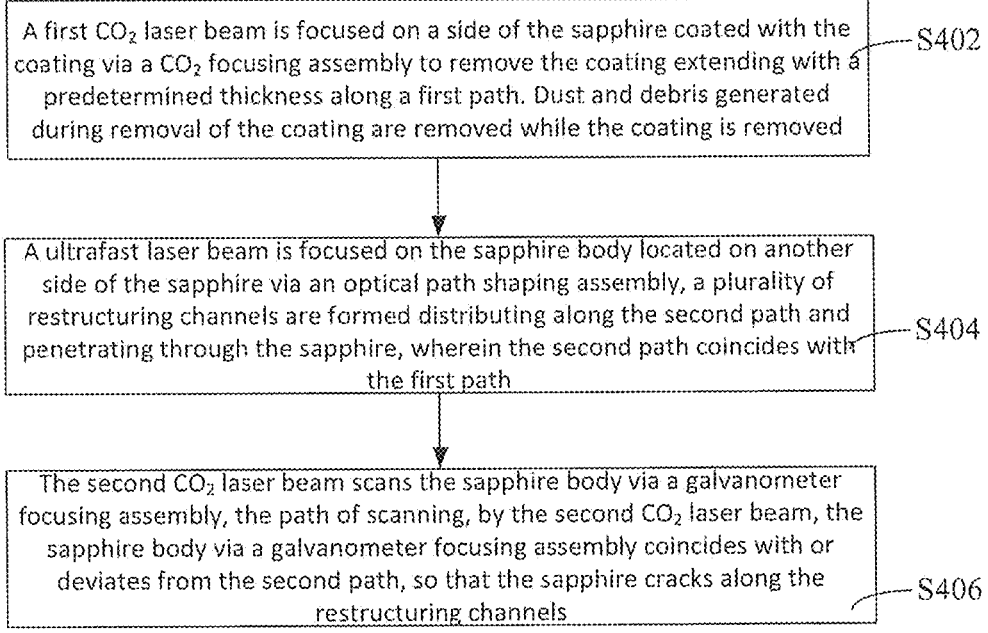
FIG. 2 is a flow chart of a method for cutting the sapphire of FIG. 1.
Figure 3:
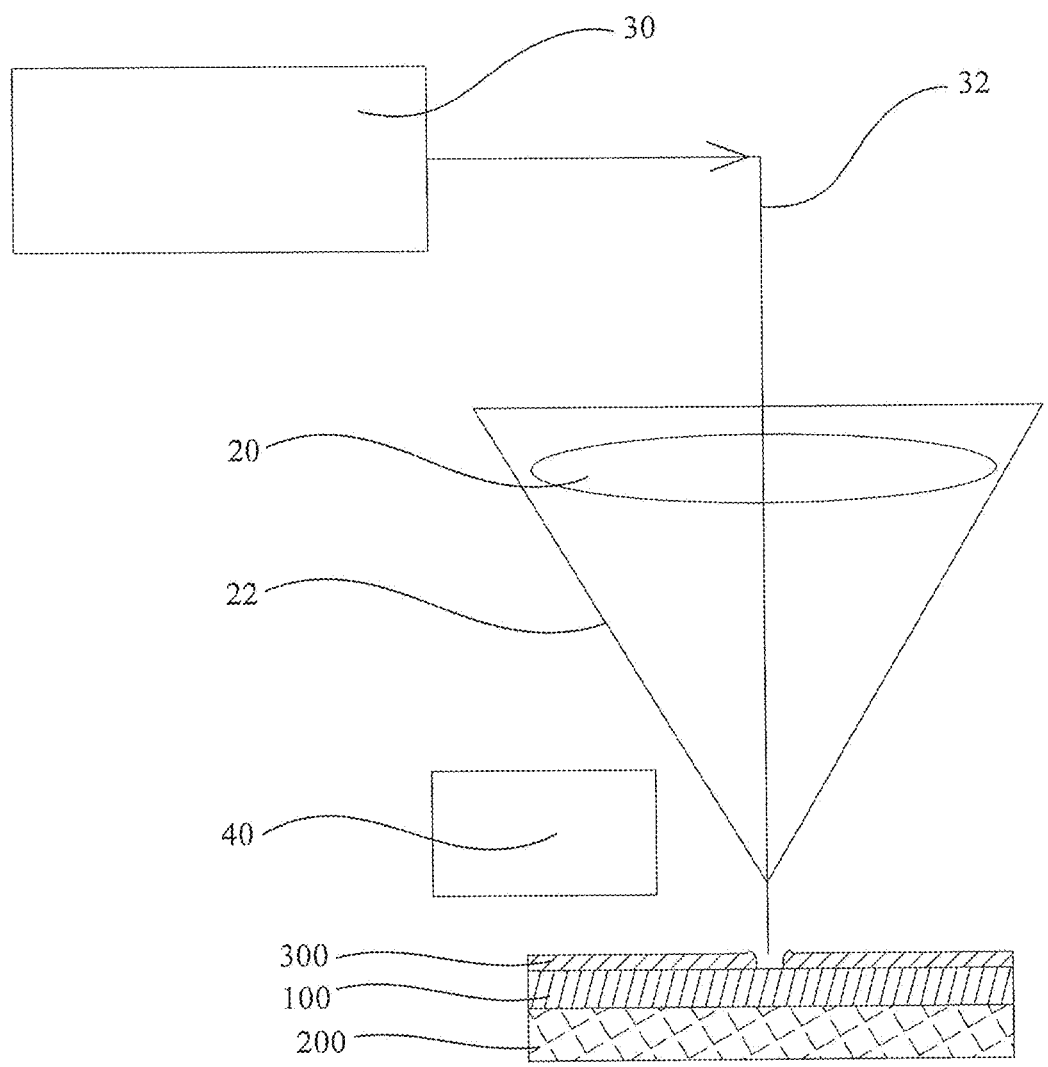
FIG. 3 is a schematic view of removing the coating in the method of FIG. 2.
Figure 4:
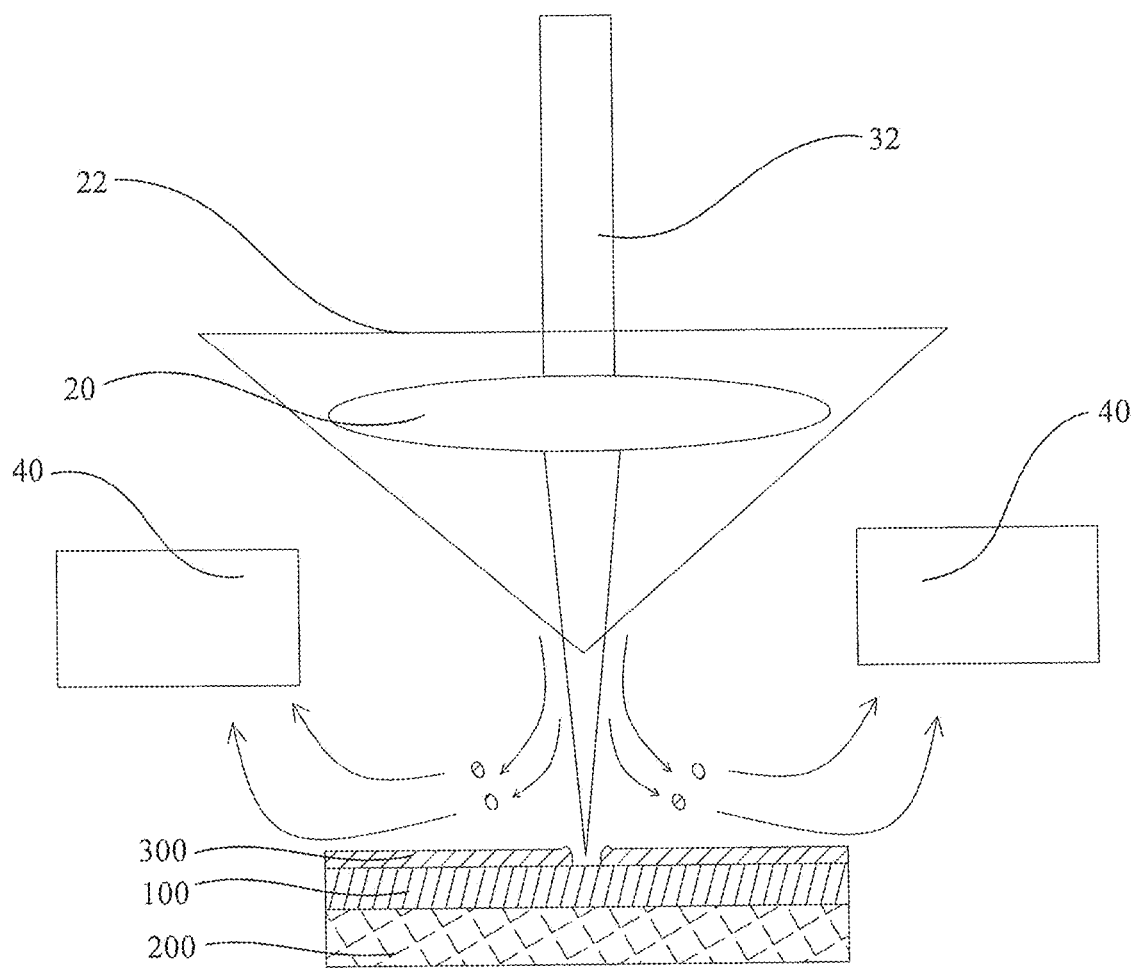
FIG. 4 is a schematic view of a processing for removing the coating of FIG. 3.

As shown in FIGS. 2 and 3, the method for sapphire 10 comprises:

In S402, a first $CO_2$ laser beam 32 is focused on a side of the sapphire 10 coated with the coating 100 via a $CO_2$ focusing assembly 20, so as to remove the coating 100 with a predetermined thickness extending along a first path (not shown in figures). Referring also to FIG. 4, dust and debris generated during removal of the coating 100 are removed while the coating 100 is removed.

In the present embodiment, as shown in FIG. 3, the side of the sapphire 10 plated with the coating 100 is placed on a processing stage (not shown in figures) under the $CO_2$ focusing assembly 20, such that a surface of the coating 100 corresponds to the $CO_2$ focusing assembly 20. The first $CO_2$ laser beam 32 is generated by a first $CO_2$ laser 30 located above the $CO_2$ focusing assembly 20. A blowing assembly 22 is provided on the $CO_2$ focusing assembly 20, and a gas blown by the blowing assembly 22 is a compressed gas. The blowing assembly 22 is used for blowing off high temperature dust and debris generated on a processed surface. A dust extraction assembly 40 is provided on the processing stage for extracting dust and debris around the processed surface.

Referring also to FIG. 4, when the first $CO_2$ laser 30 is activated, the blowing assembly 22 and the dust extraction assembly 40 are activated simultaneously, i.e., when the first $CO_2$ laser beam 32 is focused on the coating 100 via the $CO_2$ focusing assembly 20, the blowing assembly 22 and the dust extraction assembly 40 operate simultaneously to remove the dust and debris simultaneously, so that a contamination or burn of the coating 100 caused by the high temperature dust and debris splashing onto the surface of the coating 100 is prevented. As shown in FIG. 4, in one of the embodiments, the $CO_2$ focusing assembly 20 is coaxial with the blowing assembly 22, so that the blowing assembly 22 can blow off the dust and debris generated on the processed surface relatively well. The first path is the cutting path of the coating 100, i.e., the path for removing the coating 100.

In one of the embodiments, a light spot formed by focusing the first $CO_2$ laser beam 32 on the coating 100 via the $CO_2$ focusing assembly 20 is a Gaussian light spot or a flat topped light spot or an M-shaped light spot. In one of the embodiments, a light spot formed by focusing the first $CO_2$ laser beam 32 on the coating 100 via the $CO_2$ focusing assembly 20 has an overlap ratio of 50% to 90%, so that the coating 100 can be well removed. In the present embodiment, the light spot formed by focusing the first $CO_2$ laser beam 32 on the coating 100 via the $CO_2$ focusing assembly 20 can remove the coating 100 with a predetermined thickness.

In the present embodiment, the first $CO_2$ laser 30 is a pulsed laser. A power of the first $CO_2$ laser beam 32 is from 10 W to 200 W, and a frequency of the first $CO_2$ laser beam 32 is from 1 KHz to 20 KHz, and a speed of the first $CO_2$ laser beam 32 is from 10 mm/s to 300 mm/s, and a light spot of the first $CO_2$ laser beam 32 has a diameter of 20 μm to 100 μm. Parameters of the $CO_2$ laser beam are selected reasonably, such that a energy density of the $CO_2$ laser acting on the coating 100 is less than a damage threshold $F_{th}$ of the sapphire body 200, and the coating 100 with a predetermined thickness can be removed effectively. For the pulsed laser, the spacing of two consecutive pulses is called as an overlap amount or a pulse spacing. A formula of a pulse overlap ratio (overlap rate) is:

$$U_p = \left[1 - \frac{v}{f \times 2 \times \omega}\right] \times 100\%$$

where $U_p$ is the pulse overlap ratio (overlap rate), $\omega$ is the beam waist radius (μm) of the spot; u is the speed (mm/s); f is the frequency (KHz).

In the present embodiment, the first path is an arc-shaped curve, and in other embodiments, the first path may also be a curve with other shapes. The sapphire 10 is fixed on a fixture (not shown in figures) by means of a adsorption or a mechanical clamping, and the fixture is disposed on a first XY motion platform (not shown in figures), which drives the fixture to remove the coating 100 on the sapphire 10 along the first path.

In one of the embodiments, the predetermined thickness is from 10 μm to 200 μm. In one of the embodiments, the predetermined thickness equals to a thickness of the coating 100. In the present embodiment, the first $CO_2$ laser beam 32 removes the entire coating 100 along the first path.

Figure 5:
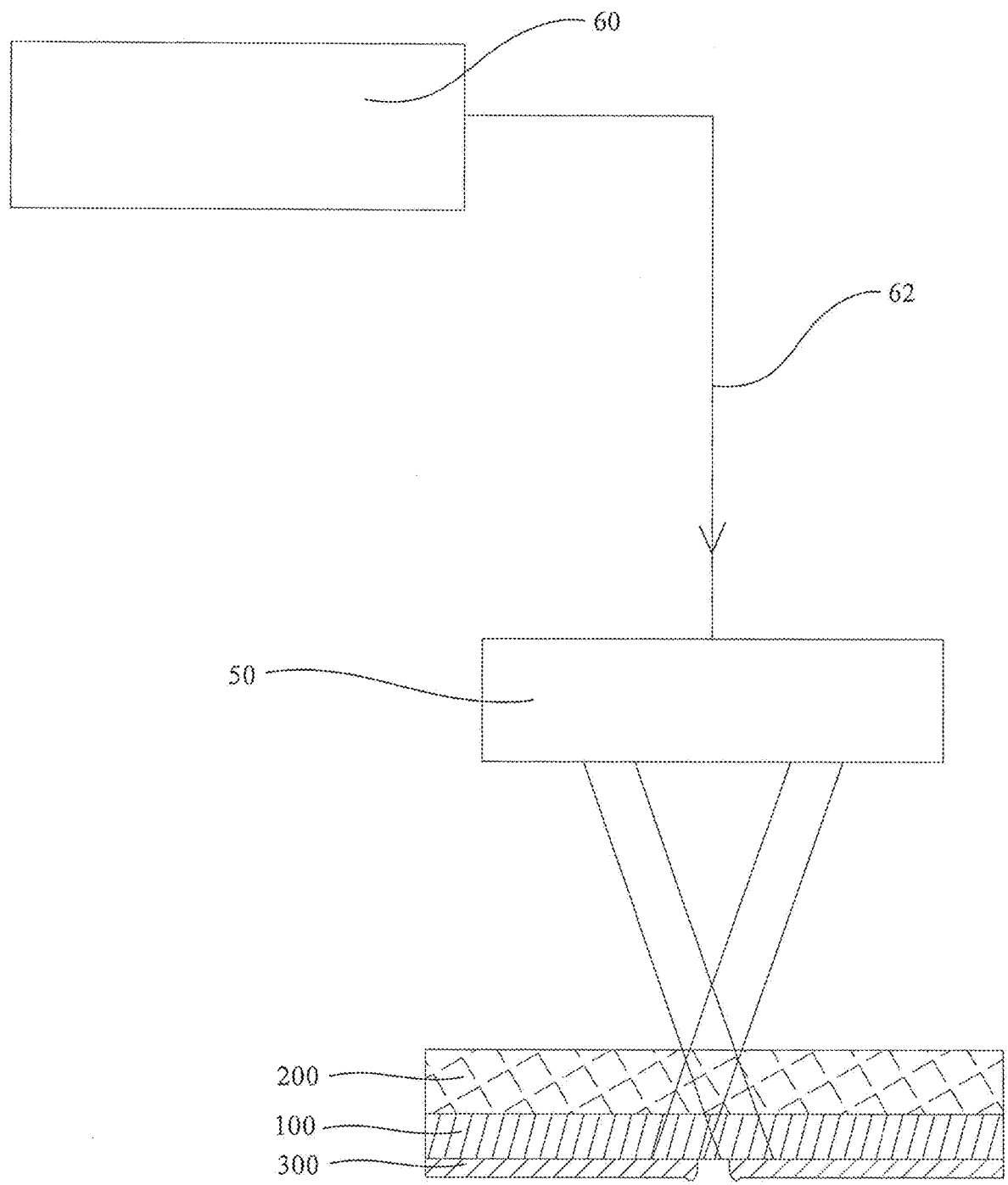
FIG. 5 is a schematic view of cutting the sapphire in the method of FIG. 2.
Figure 6:
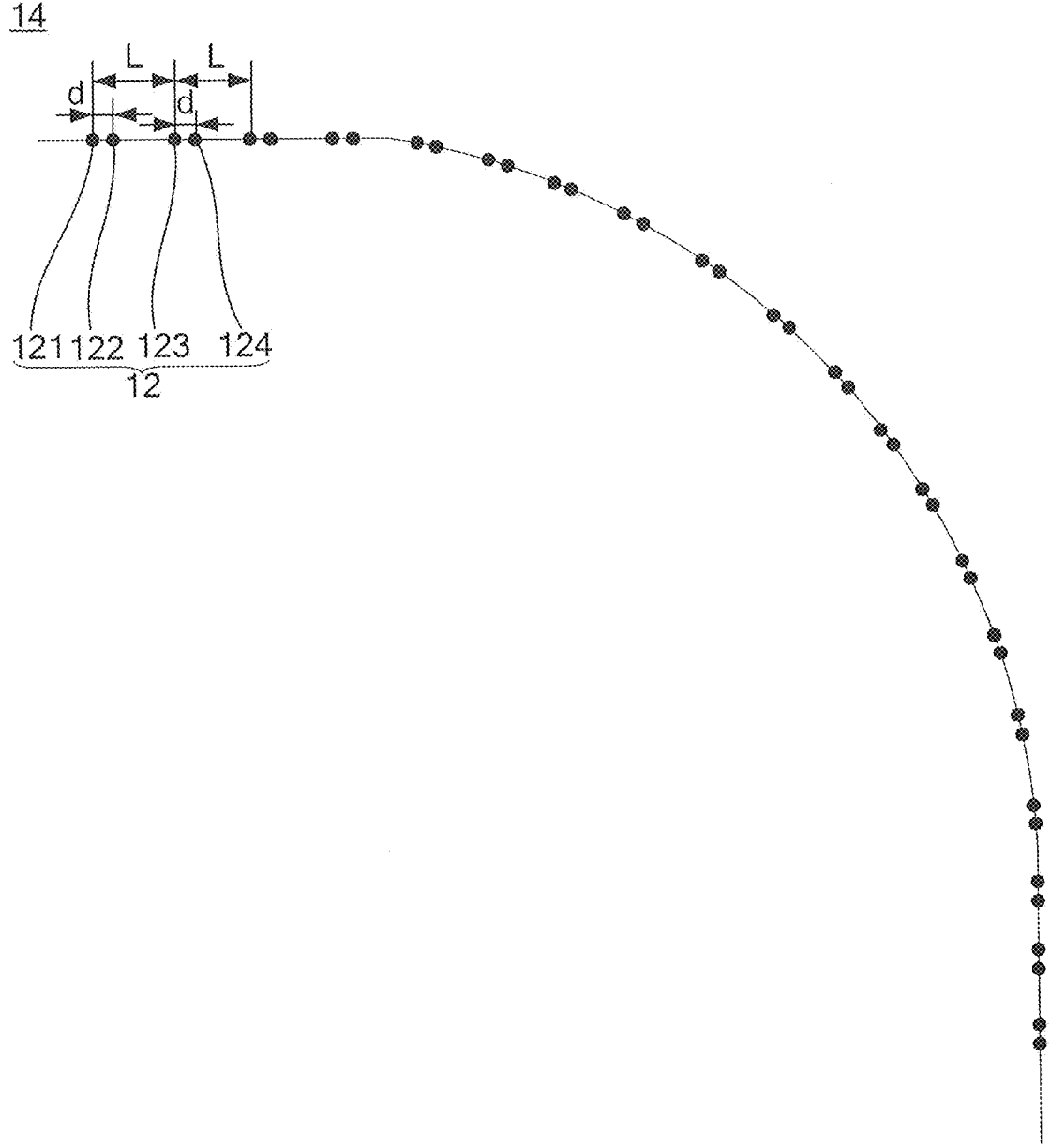
FIG. 6 is a schematic view of a distribution of a plurality of restructuring channels along a second path during cutting the sapphire of FIG. 5.

In S404, as shown in FIG. 5, an ultrafast laser beam 62 is focused on the sapphire body 200 located on another side of the sapphire 10 via an optical path shaping assembly 50, referring also to FIG. 6, a plurality of restructuring channels 12 are formed distributing along the second path 14 and penetrating through the sapphire 10, wherein the second path 14 coincides with the first path.

In the present embodiment, as shown in FIG. 5, a surface of the sapphire body 200 corresponds to the optical path shaping assembly 50. The ultrafast laser beam 62 generated by an ultrafast laser 60 located above the optical path shaping assembly 50 is projected onto the surface of the sapphire body 200 placed on the processing stage after focusing via the optical path shaping assembly 50 to form a plurality of restructuring channels 12 distributed along the second path 14 and penetrating through the sapphire 10. The ultrafast laser beam 62 generated by the ultrafast laser 60 has a relative shorter laser pulse and a relative higher peak power, and a pulse duration of the ultrafast laser beam 62 is only a few picoseconds (ps) or femtoseconds (fs), and a pulse width of the fast laser beam 62 is less than 50 ps. Specifically, in the present embodiment, the ultrafast laser 60 is an infrared picosecond laser having a relative higher transmittance for the sapphire 10.

Figure 7:
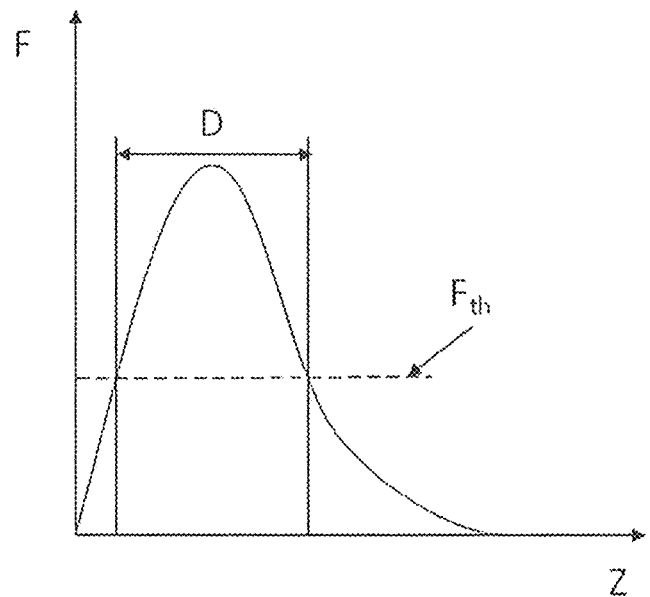
FIG. 7 is a diagram illustrating a relationship between an energy density of a focused light spot and a focal depth of the light spot during cutting the sapphire of FIG. 5.

The second path 14 is a cutting path of the sapphire body 200 and coincides with the first path. A laser energy density of the ultrafast laser beam 62 after focusing via the optical path shaping assembly 50 is greater than a damage threshold $F_{th}$ of the sapphire body 200 to form the restructuring channels 12 on the sapphire 10. FIG. 7 is a schematic view showing an effective focal depth of the optical path shaping assembly after focusing, and a horizontal axis of the schematic view represents the focal depth of the light spot indicated by a symbol Z. A vertical axis of the schematic view represents the energy density of the focused light spot indicated by a symbol F. As shown in FIG. 7, process parameters of the processing of the ultrafast laser 60 is adjusted reasonably, such that the focused spot formed after focusing the ultrafast laser beam 62 via the optical path shaping assembly 50 has the laser energy density F greater than or equal to the damage threshold $F_{th}$ of the sapphire body 200, and a length D of the focal depth of the light spot is greater than or equal to the thickness of the sapphire 10.

In one of the embodiments, the ultrafast laser beam 62 is an infrared laser beam or a green laser beam with a pulse width of 100 fs to 50 ps.

Figure 8:
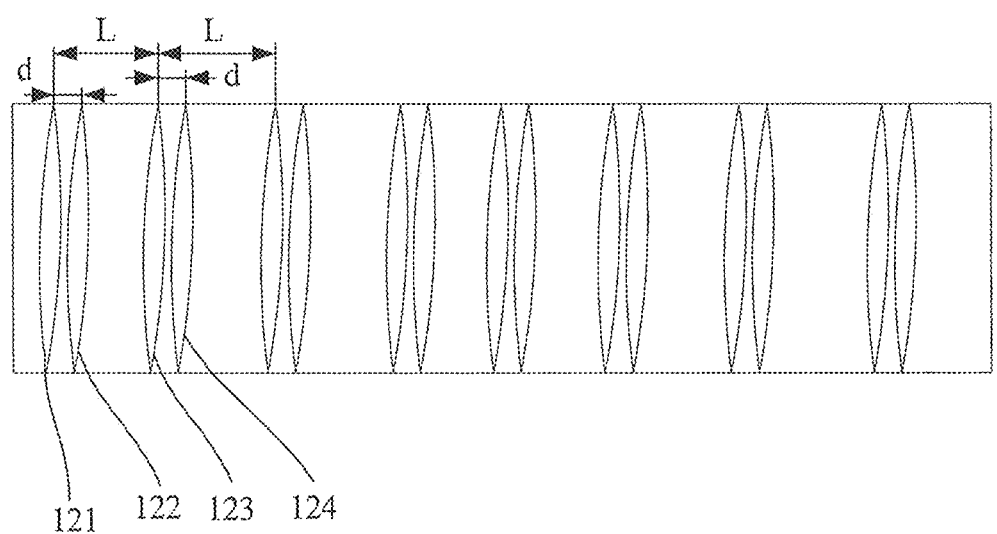
FIG. 8 is a schematic view of a plurality of restructuring channels distributed inside the sapphire during cutting the sapphire of FIG. 5.

In one of the embodiments, the ultrafast laser beam 62 is a laser beam with one or more pulse trains. One or more pulse trains form a pulse envelope. Each pulse envelope forms one or more restructuring channels 12 inside the sapphire. One or more restructuring channels 12 constitute a set of restructuring channels. As shown in FIGS. 6 and 8, specifically, in the present embodiment, each pulse envelope consists two pulse trains and forms two restructuring channels 12 inside the sapphire 10, in this case, two restructuring channels 12 constitute one set of restructuring channels.

In the present embodiment, the sapphire 10 is located on a second XY motion platform (not shown in figures), and the second XY motion platform is further provided with a second servo drive system (not shown in figures) based on a position trigger function. When the second XY motion platform moves to a certain distance, the second servo drive system sends a second control signal to the ultrafast laser 60, and the ultrafast laser 60 can emit a pulse envelope of the pulsed laser beam according to the second control signal. As shown in FIG. 6, specifically, the second path 14 is an arc-shaped curve. The motion of the second XY motion platform drives the sapphire 10 to move along the second path 14, and the second motion servo drive system processes the motion information of the second XY motion platform, so that the ultrafast laser beam 62 can form a plurality of evenly spaced sets of restructured channels inside the sapphire 10. When the set of restructuring channels consists three or more restructuring channels 12, the restructuring channels 12 inside the set of restructuring channels may be distributed evenly or unevenly. In the present embodiment, the set of restructuring channels consists of two restructuring channels 12. A distance between the adjacent two set of restructuring channels is L, and L is from 3 μm to 3 mm. The distance between the two restructuring channels 12 inside a set of restructuring channels is d, and d is from 0 μm to 3 μm.

As shown in FIG. 6 and FIG. 8, two restructuring channels 12 generated by a first pulse envelope of the pulsed laser beam are a first restructuring channel 121 and a second restructuring channel 122 respectively. The first restructuring channel 121 and the second restructuring channel 122 constitute a first set of restructuring channels. Two restructuring channels generated by a second pulse envelope of the pulsed laser beam are a third restructuring channel 123 and a fourth restructuring channel 124 respectively. The third restructuring channel 123 and the fourth restructuring channel 124 constitute a second set of restructuring channels. A distance between the first restructuring channel 121 and the second restructuring channel 122 and a distance between the third restructuring channel 123 and the fourth restructuring channel 124 both equal to d. A distance between the first set of restructuring channels and the second set of restructuring channels is L, and a distance between the first restructuring channel 121 and the third restructuring channel 123 and a distance between the second restructuring channel 122 and the fourth restructuring channel 124 both equal to L. By parity of reasoning, two restructuring channels generated by an nth (n≥2) pulse envelope of the pulsed laser beam are a 2n−1th restructuring channel and a 2nth restructuring channel respectively, and the 2n−1th restructuring channel and the 2nth restructuring channel constitute a nth set of restructuring channels. A distance between the 2n−1th restructuring channel and the 2nth restructuring channel equals to d, and a distance between a 2n−3th restructuring channel and the 2n−1th restructuring channel and the distance between a 2n−2th restructuring channel and the 2nth restructuring channel can be equal to L.

Figure 9:
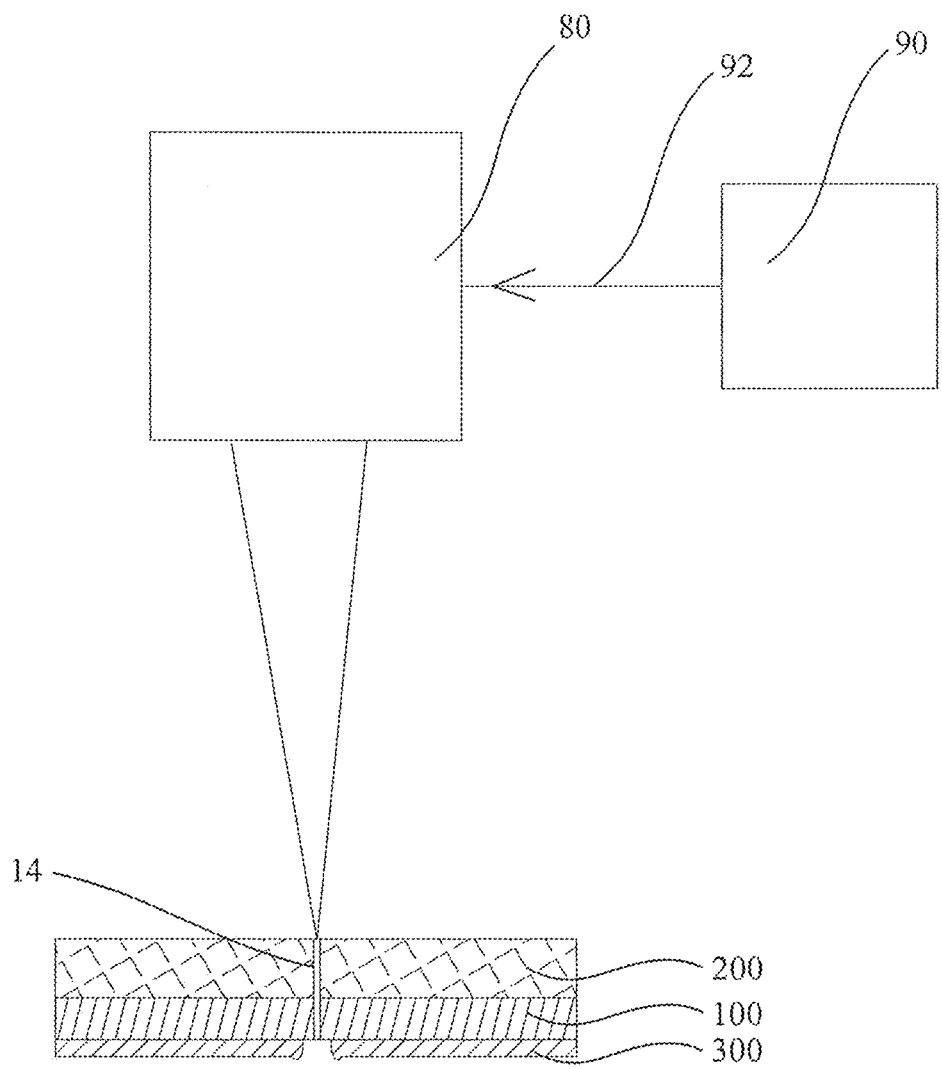
FIG. 9 is a schematic view of separating the sapphire in the method of FIG. 2.

In S406, referring to FIG. 9, the second $CO_2$ laser beam 92 scans the sapphire body 200 via a galvanometer focusing assembly 80, the path of scanning, by the second $CO_2$ laser beam 92, the sapphire body 200 via a galvanometer focusing assembly 80 coincides with or deviates from the second path 14, so that the sapphire 10 cracks along the restructuring channels 12.

In the present embodiment, the galvanometer focusing assembly 80 is disposed above the sapphire body 200. A second $CO_2$ laser beam 92 is generated by a second $CO_2$ laser 90. The second $CO_2$ laser beam 92 scans the surface of the sapphire body 200 along the second path 14 via the galvanometer focusing assembly 80. The sapphire 10 absorbs the energy of the second $CO_2$ laser and produces a localized striped stress distributed over the second path 14, and a stress intensity is sufficient to cause the sapphire 10 to crack along the second path 14, so that a finished product after cutting is separated from scraps automatically. Since a plurality of evenly spaced restructuring channels 12 is distributed along the second path 14 evenly, the stress gradient generated by the expansion of the sapphire 10 caused by absorbing the energy of the second $CO_2$ laser beam 92 is distributed along the second path 14 evenly, so that ultimately, the sapphire 10 cracks evenly along the second path 14, thereby a cutting surface of the sapphire 10 is relative smooth.

Figure 10:
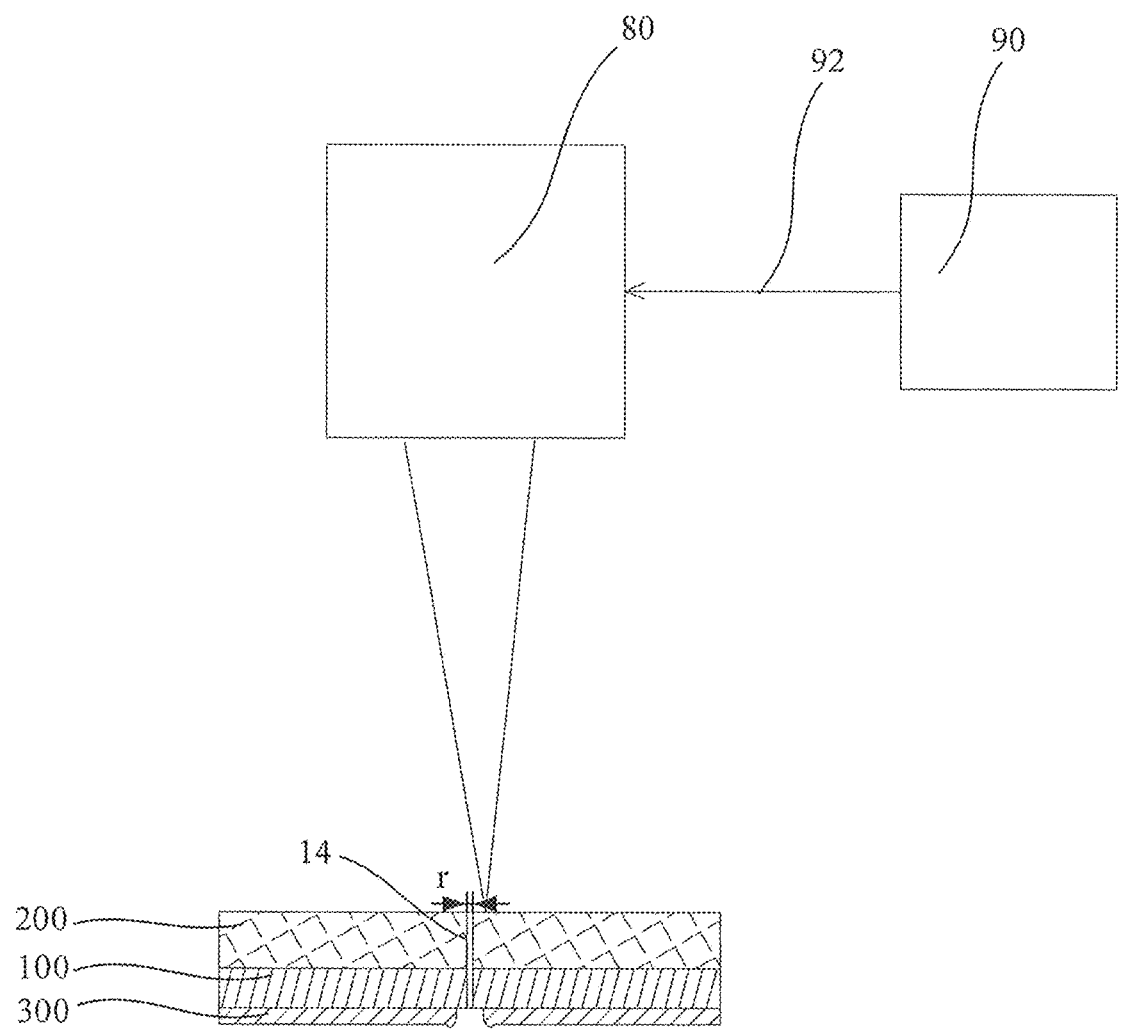
FIG. 10 is a schematic view illustrating the focused light spot deviating from the restructuring channels during separating the sapphire of FIG. 9.

As shown in FIG. 10, in a separating process of the sapphire 10, the second $CO_2$ laser beam 92 is focused on the surface of the sapphire body 200 via the galvanometer focusing assembly 80, and a center of the light spot of a focused second $CO_2$ laser performs a scanning along a path offset from the second path 14 by a certain distance r, and the sapphire 10 absorbs the energy of the second $CO_2$ laser to form a distribution of a localized striped stress. Process parameters of the second $CO_2$ laser beam 92 is selected reasonably, such that the energy of the second $CO_2$ laser beam 92 focusing on the sapphire body 200 via the galvanometer focusing assembly 80 cannot damage the sapphire body 200. However, a stress generated by the sapphire 10 absorbing the energy of the second $CO_2$ laser causes the sapphire 10 to crack along the second path 14, and a cracking speed is coordinated with a scanning speed of the second $CO_2$ laser beam 92. Specifically, in the present embodiment, an overlap ratio of a light spot formed by the second $CO_2$ laser beam 92 focusing on the sapphire body 200 via the galvanometer focusing assembly 80 is from 70% to 95%, and a frequency of the second $CO_2$ laser beam 92 is from 1 KHz to 15 KHz, and a speed of the second $CO_2$ laser beam 92 is from 10 mm/s to 500 mm/s.

As shown in FIG. 10, in one of the embodiments, a deviation distance r between the path of the second $CO_2$ laser beam 92 scanning the sapphire body 200 via the galvanometer focusing assembly 80 and the second path 14 is less than or equals to 2 mm to ensure that the heat converted by the sapphire 10 after absorbing the energy of the second $CO_2$ laser cannot damage the material of the coating 100.

In one of the embodiments, the light spot formed by focusing the second $CO_2$ laser beam 92 on the sapphire body 200 via the galvanometer focusing assembly 80 has a diameter of 50 μm to 3000 μm.

In one of the embodiments, a processing method for forming the restructuring channels 12 penetrating through the sapphire 10 is a long focal depth focusing system method or a laser filamentation processing method. Specifically, in the present embodiment, the processing method for forming the restructuring channels 12 penetrating through the sapphire 10 is the long focal depth focusing system method. When the energy density value of the focused light spot formed by focusing the second $CO_2$ laser beam 92 on the surface of the sapphire body 200 via the galvanometer focusing assembly reaches the damage threshold of the sapphire body 200, the sapphire body 200 is cut through at once. In one of the embodiments, the processing method for forming the restructuring channels 12 penetrating through the sapphire 10 is the laser filamentation processing method, which forms a plasma channel inside the sapphire 10.

Figure 11:
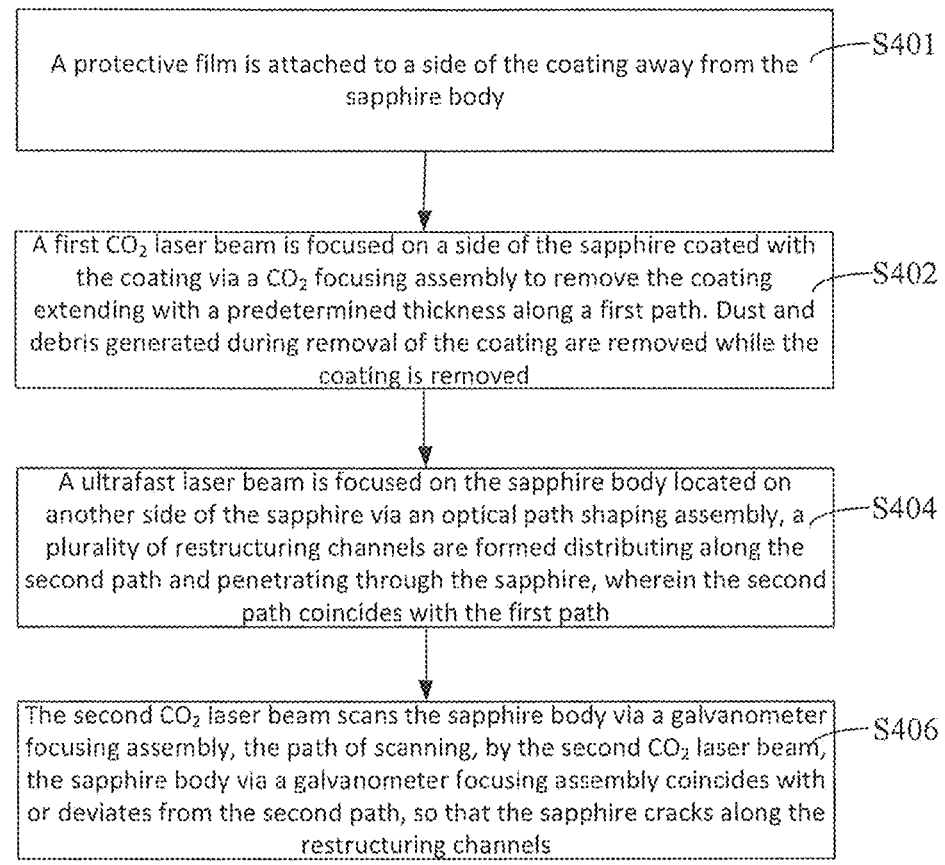
FIG. 11 is another flow chart of a method for cutting the sapphire of FIG. 1.

As shown in FIG. 11, in one of the embodiments, the first $CO_2$ laser beam 32 is focused on the coating 100 by the $CO_2$ focusing assembly 20 to remove the coating 100 with a predetermined thickness extending along a first path. The step S402 is used for removing dust and debris generated during removal of the coating 100 while removing the coating 100, and prior to the step S402, it further comprises:

In S401, a protective film 300 is attached to a side of the coating 100 away from the sapphire body 200. The protective film 300 can prevent the coating 100 from being in direct contact with the air, and during the ablation and heating by the first $CO_2$ laser beam 32 for removing the coating 100, the protective film 300 can prevent the coating from 100 being oxidized, thereby the protective film 300 protects the coating 100. As shown in FIG. 1, in the present embodiment, the protective film 300 is attached to the side of the coating 100 away from the sapphire body 200. The protective film 300 is made of PP (Polypropylene) or PVC (Polyvinyl chloride) or PET (Polyethylene terephthalate) or PE (Polyethylene) or OPP (O-phenylphenol) or other material.

Figure 12:
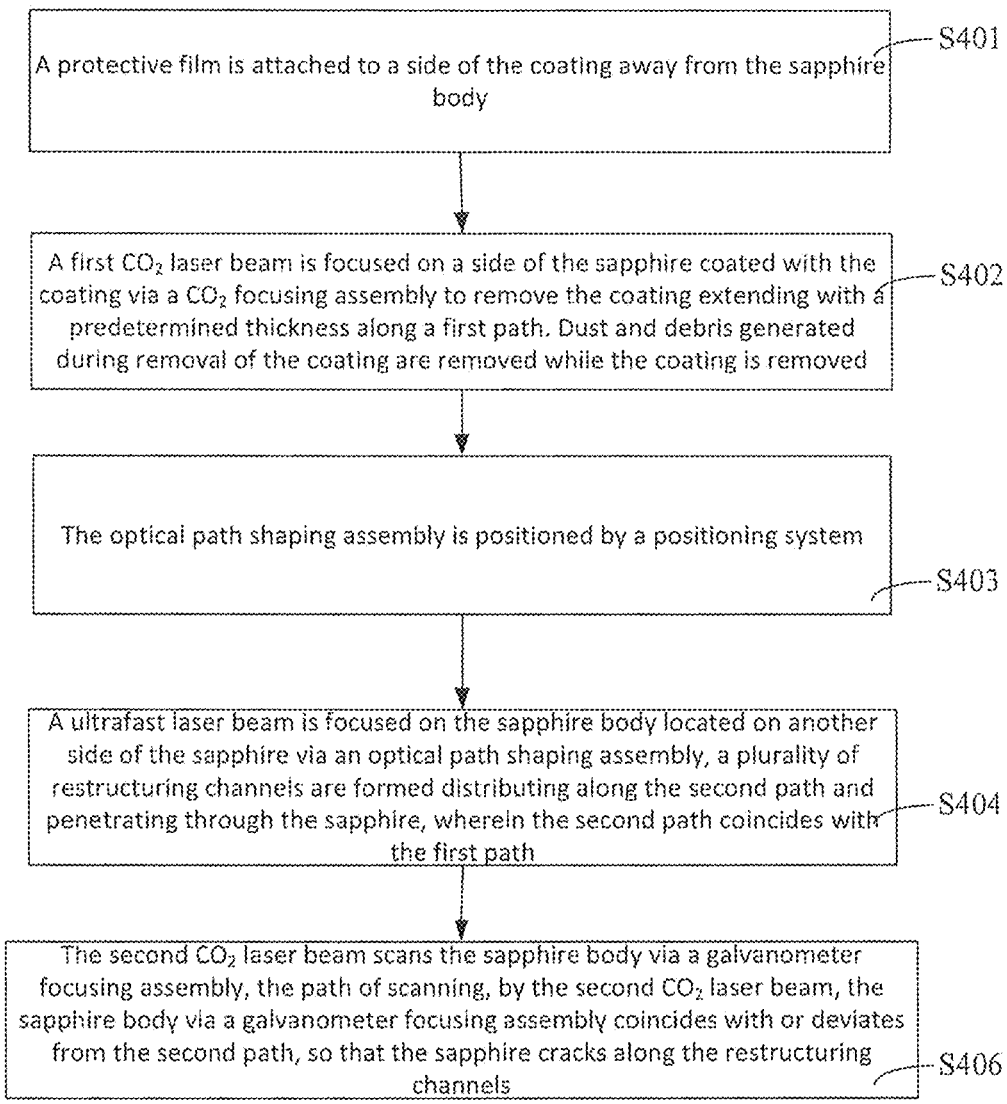
FIG. 12 is still another flow chart of a method for cutting the sapphire of FIG. 1.

As shown in FIG. 12, in one of the embodiments, the ultrafast laser beam 62 is focused on the sapphire body 200 via the optical path shaping assembly 50 to form a plurality of restructuring channels 12 distributed along the second path and penetrating through the sapphire, which is represented by the step S404, and prior to the step S404, it further comprises:

In S403, the optical path shaping assembly 50 is positioned by a positioning system (not shown in figures), such that the first path coincides with the second path 14, which makes the processed surface of the sapphire 10 smoother.

A device for cutting sapphire 10 comprises a first $CO_2$ laser 30, a $CO_2$ focusing assembly 20, a blowing assembly 22, a dust extraction assembly 40, an ultrafast laser 60, an optical path shaping assembly 50, a second $CO_2$ laser 90, and a galvanometer focusing assembly 80. The first $CO_2$ laser 30 is configured to generate a first $CO_2$ laser beam. The $CO_2$ focusing assembly 20 is disposed on the first $CO_2$ laser 30 and configured to focus the first $CO_2$ laser beam on the coating 100 to remove the coating 100 with a predetermined thickness along a first path extending. The air blowing assembly 22 is disposed on the $CO_2$ focusing assembly 20 and configured to blow off dust and debris generated during removal of the coating 100. The dust extraction assembly 40 is configured to extract dust and debris. The ultrafast laser 60 is configured to generate an ultrafast laser beam. The optical path shaping assembly 50 is disposed on the ultrafast laser 60 and configured to focus the ultrafast laser beam on the sapphire body 200 to form a plurality of restructuring channels distributed along the second path 14 and penetrating through the sapphire. The second $CO_2$ laser 90 is configured to generate a second $CO_2$ laser beam. The galvanometer focusing assembly 80 is disposed on the second $CO_2$ laser 90 and configured to scan the sapphire body 200 by the second $CO_2$ laser beam, so that the sapphire 10 cracks along the restructuring channels.

In one of the embodiments, the blowing assembly 22 is disposed coaxially with the $CO_2$ focusing assembly 20. In one of the embodiments, the device for cutting the sapphire 10 further comprises a first XY motion platform and a first servo drive system. The first servo drive system is disposed on and in communication with the first XY motion platform. The first servo drive system controls the motion of the first XY motion platform, such that the first XY motion platform drives the sapphire 10 to move along the first path.

In one of the embodiments, the device for cutting the sapphire 10 further comprises a second XY motion platform and a second servo drive system. The second servo drive system is disposed on and in communication with the second XY motion platform. The second servo drive system controls the motion of the second XY motion platform, such that the second XY motion platform drives the sapphire 10 to move along the second path 14.

In the method and device for cutting sapphire 10 of the present embodiment, firstly, the first $CO_2$ laser beam 32 is focused on the side plated with the coating 100 via the $CO_2$ focusing assembly 20 to remove the coating 100 with a predetermined thickness, meanwhile, the dust and debris generated during the processing are removed, so that during removal of the coating 100, a contamination or burn of the coating 100 caused by debris or dust with spark splashing onto the surface of coating 100 can be avoided. And then the ultrafast laser beam 62 is shaped and focused on the sapphire body 200 located on the side of the sapphire 10 away from the coating 100 via the optical path shaping assembly 50 to form the restructuring channels 12 penetrating through the sapphire 10, as a result, the subsequent laser processed surface is relative smooth. Finally, the path of the second $CO_2$ laser beam 92 scanning the sapphire body 200 via the galvanometer focusing assembly 80 coincides with or deviates from the second path. The sapphire 10 can expand and generate the stress gradient after absorbing the energy of the second $CO_2$ laser beam 92, i.e., crack will appear on the path of scanning the sapphire body 200 via the galvanometer focusing assembly 80, so that the sapphire 10 cracks along the restructuring channels 12, thereby the sapphire 10 is cut and the damaged area of the coating 100 is relative small after the entire sapphire 10 is cut. Therefore, the problem that the damage area of the coating 100 is large after the conventional direct processing of the composite material of the sapphire 10 with the coating 100 is solved. Generally, the processing method for directly cutting the composite material of the sapphire 10 with the coating 100 is a multifocal focusing penetrative cutting method, and the multifocal focusing penetrative cutting method is performed by binary optical components or different divergence angles or other methods to achieve a multifocal cutting. However, the energy distribution between the multifocals is not uniform, so that the surface after cutting is a relative rougher, thereby the strength of the coating 100 of the sapphire 10 after processing is relative lower.

Figure 13:
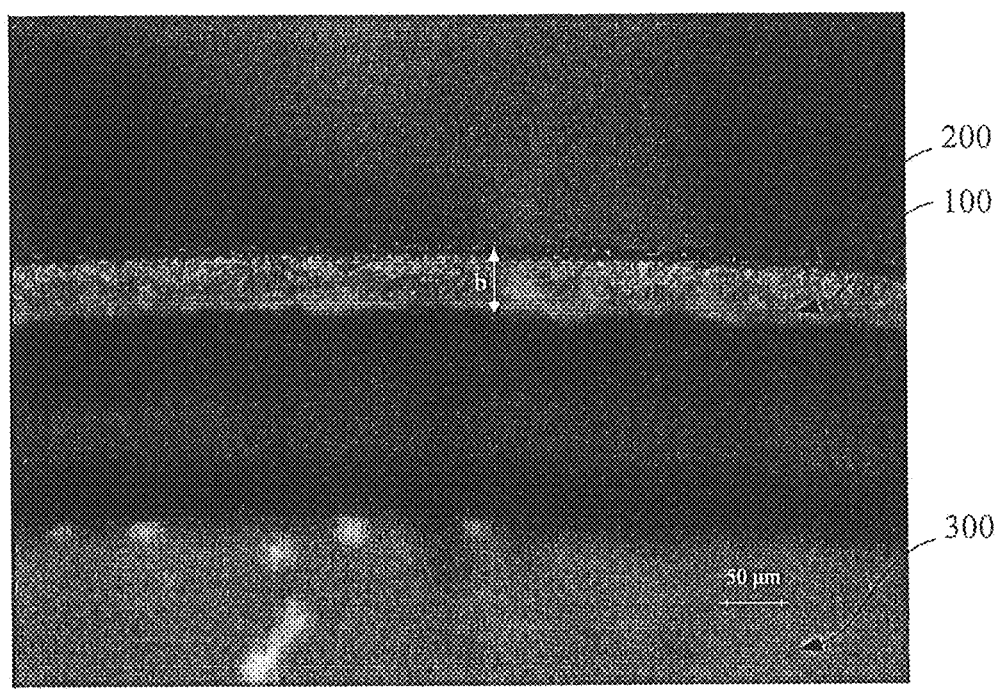
FIG. 13 is an effect picture of the sapphire processed by the method of FIG. 2.

A process step of the method and device for cutting sapphire 10 according to the present embodiment may comprise three phases of thinning of coating 100, cutting of sapphire 10, and separation of sapphire 10. Since the phase of thinning of coating 100 is performed on the side of sapphire 10 plated with the coating 100, and the phases of cutting and separation of sapphire 10 are performed on the side of the sapphire body 200, so that general problems existed in the sapphire cutting are solved, and the cutting of the composite material of the sapphire 10 with the coating 100 is achieved, so that the roughness of a cut section of the sapphire 10 with the coating 100 is small, and the strength of the sapphire 10 is relative high. For the composite material of the sapphire 10 with the coating 100, a discoloration and reduced adhesion problem of processing the coating 100 are solved. After the sapphire 10 is separated, scraps of sapphire 10 are separated from the finished product of sapphire 10, so that a relative better sapphire 10 cross-section as shown in FIG. 13 is obtained. As shown in figures, a removed predetermined thickness b of the coating 100 equals to the half thickness of the coating 100.

The technical features of the above-described embodiments may be combined arbitrarily. To simplify the description, all the possible combinations of the technical features in the above embodiments are not described. However, all of the combinations of these technical features should be considered as within the scope of the disclosure, as long as such combinations do not contradict with each other.

The above-described embodiments merely represent several embodiments of the present disclosure, and the description thereof is more specific and detailed, but it should not be construed as limiting the scope of the present disclosure. It should be noted that, for those skilled in the art, several variations and improvements may be made without departing from the concept of the present disclosure, and these are all within the protection scope of the present disclosure. Therefore, the scope of protection of the present disclosure shall be subject to the appended claims.

What is claimed is:

1. A method for cutting sapphire comprising a sapphire body and a coating formed on a first side of the sapphire body, the method comprising:
    focusing a first $CO_2$ laser beam on the coating via a $CO_2$ focusing assembly to remove the coating with a predetermined thickness extending along a first path; wherein the predetermined thickness is equal to a thickness of the coating, wherein dust and debris generated during removal of the coating are removed while the coating is removed;
    focusing an ultrafast laser beam on a second side of the sapphire body opposite to the first side via an optical path shaping assembly to form a plurality of restructuring channels distributed along a second path and penetrating through the sapphire; wherein the second path coincides with the first path; and
    scanning, by a second $CO_2$ laser beam, the second side of the sapphire body via a galvanometer focusing assembly, wherein a path of the second $CO_2$ laser beam scanning the sapphire body via a galvanometer focusing assembly coincides with or deviates from the second path, so that the sapphire cracks along the restructuring channels.

2. The method of claim 1, wherein prior to focusing the first $CO_2$ laser beam on the coating via the $CO_2$ focusing assembly, the method further comprises:
    attaching a protective film on a side of the coating away from the sapphire body.

3. The method of claim 1, wherein a light spot formed by focusing the first $CO_2$ laser beam on the coating via the $CO_2$ focusing assembly is a Gaussian light spot or a flat topped light spot or an M-shaped light spot.

4. The method of claim 1, wherein a light spot formed by focusing the first $CO_2$ laser beam on the coating via the $CO_2$ focusing assembly has an overlap ratio of 50% to 90%.

5. The method of claim 1, wherein a frequency of the first $CO_2$ laser beam is from 1 KHz to 20 KHz, and a speed of the first $CO_2$ laser beam is from 10 mm/s to 500 mm/s, and a light spot of the first $CO_2$ laser beam has a diameter of 20 μm to 100 μm.

6. The method of claim 1, wherein the predetermined thickness is from 10 μm to 200 μm.

7. The method of claim 1, wherein prior to focusing the ultrafast laser beam on the coating via the optical path shaping assembly, the method further comprises:
    positioning the optical path shaping assembly via a positioning system, such that the first path coincides with the second path.

8. The method of claim 1, wherein both of the first path and the second path are arc-shaped curves.

9. The method of claim 1, wherein the restructuring channels penetrating through the sapphire is formed by a long focal depth focusing system method or a laser filamentation processing method.

10. The method of claim 1, wherein the ultrafast laser beam is an infrared laser beam or a green laser beam with a pulse width of 100 fs to 50 ps.

11. The method of claim 1, wherein the ultrafast laser beam is a laser beam with one or more pulse trains, and a pulsed laser beam of one of the pulse trains generates one restructuring channel.

12. The method of claim 1, wherein the light spot formed by focusing the second $CO_2$ laser beam on the sapphire body via the galvanometer focusing assembly has an overlap ratio of 70% to 95%.

13. The method of claim 1, wherein a deviation distance between the path of the second $CO_2$ laser beam scanning the sapphire body via the galvanometer focusing assembly and the second path is less than or equals to 2 mm.

14. The method of claim 1, wherein the light spot formed by focusing the second $CO_2$ laser beam on the sapphire body via the galvanometer focusing assembly has a diameter of 50 μm to 3000 μm.

15. A device for cutting sapphire comprising a sapphire body and a coating formed on a first side of the sapphire body, comprising:
    a first $CO_2$ laser configured to generate a first $CO_2$ laser beam;
    a $CO_2$ focusing assembly disposed on the first $CO_2$ laser and configured to focus the first $CO_2$ laser beam on the coating to remove the coating with a predetermined thickness extending along a first path, the predetermined thickness being equal to a thickness of the coating;

a blowing assembly disposed on the $CO_2$ focusing assembly and configured to blow off dust and debris generated during removal of the coating;

a dust extraction assembly configured to extract the dust and the debris;

an ultrafast laser configured to generate a ultrafast laser beam;

an optical path shaping assembly disposed on the ultrafast laser and configured to focus the ultrafast laser beam on a second side of the sapphire body opposite to the first side to form a plurality of restructuring channels distributed along the second path and penetrating through the sapphire;

a second $CO_2$ laser configured to generate a second $CO_2$ laser beam; and a galvanometer focusing assembly disposed on the second $CO_2$ laser and configured to enable the second $CO_2$ laser beam to scan the second side of the sapphire body, so that the sapphire cracks along the restructuring channels.

16. The device of claim 15, wherein the blowing assembly is disposed coaxially with the $CO_2$ focusing assembly.

* * * * *